United States Patent
Ghosh et al.

(10) Patent No.: US 12,338,728 B2
(45) Date of Patent: Jun. 24, 2025

(54) CUTTER ASSEMBLY AND METHODS FOR MAKING SAME (71) Applicant: Element Six (UK) Limited, Oxfordshire (GB)

(72) Inventors: Santonu Ghosh, Oxfordshire (GB); Christopher John Howard Wort, Oxfordshire (GB); Vijay Nadasen Vythilingum, Oxfordshire (GB)

(73) Assignee: Element Six (UK) Limited, Didcot (GB)

( * ) Notice: Subject to any disclaimer, the term of this patent is extended or adjusted under 35 U.S.C. 154(b) by 683 days.

(21) Appl. No.: 17/613,736

(22) PCT Filed: May 27, 2020

(86) PCT No.: PCT/EP2020/064634
§ 371 (c)(1),
(2) Date: Nov. 23, 2021

(87) PCT Pub. No.: WO2020/239799
PCT Pub. Date: Dec. 3, 2020

(65) Prior Publication Data
US 2022/0234113 A1 Jul. 28, 2022

(30) Foreign Application Priority Data
May 28, 2019 (GB) .................................... 1907505

(51) Int. Cl.
*E21B 47/013* (2012.01)
*B23K 1/00* (2006.01)
(Continued)

(52) U.S. Cl.
CPC .......... *E21B 47/013* (2020.05); *B23K 1/0008* (2013.01); *B23K 20/002* (2013.01);
(Continued)

(58) Field of Classification Search
CPC .. E21B 47/013; E21B 10/5676; E21B 47/017; B23K 1/0008; B23K 20/002;
(Continued)

(56) References Cited

U.S. PATENT DOCUMENTS 4,593,776 A * 6/1986 Salesky ................... E21B 10/46
175/375
8,746,367 B2 * 6/2014 DiGiovanni .......... E21B 47/013
175/428
(Continued)

FOREIGN PATENT DOCUMENTS

WO 2014028685 A1 2/2014

OTHER PUBLICATIONS

International Search Report and Written Opinion issued for PCT/EP2020/064634, dated Jul. 30, 2020 (12 pages).
(Continued)

*Primary Examiner* — Nicole Coy
*Assistant Examiner* — Jennifer A Railey
(74) *Attorney, Agent, or Firm* — Armstrong Teasdale LLP (57) ABSTRACT A cutter assembly for a cutting tool has a super-hard volume of super-hard material having a proximal end and a distal end and including a cavity; and a cover member. The super-hard volume has a super-hard surface at the distal end including a cutting edge. The cavity has a cavity open end at the distal end. The super-hard surface includes a cavity peripheral area coterminous with the cavity open end and the cover member has a cover peripheral area configured to mate with the cavity peripheral area to allow the cover member to cover the cavity at the cavity open end, the covered cavity providing a housing chamber within the super-hard volume. A method of making a cutter assembly is also disclosed.

15 Claims, 6 Drawing Sheets (51) Int. Cl.
  *B23K 20/00* (2006.01)
  *E21B 10/567* (2006.01)
(52) U.S. Cl.
  CPC .... *E21B 10/5676* (2013.01); *B23B 2226/125* (2013.01); *B23B 2226/315* (2013.01); *B23B 2240/08* (2013.01); *B23B 2260/128* (2013.01)
(58) Field of Classification Search
  CPC ........ B23B 2226/125; B23B 2226/315; B23B 2240/08; B23B 2260/128; B23B 27/145; B23B 2240/21; B22F 7/064; B22F 2005/001; B23C 5/202; B23C 2226/125; B23C 2226/315; C22C 26/00
  See application file for complete search history.

(56) References Cited

U.S. PATENT DOCUMENTS

| | | | |
|---|---|---|---|
| 2001/0003932 A1* | 6/2001 | Packer | E21B 10/567 76/108.2 |
| 2011/0061944 A1* | 3/2011 | Scott | C22C 29/08 175/428 |
| 2011/0266058 A1 | 11/2011 | Kumar et al. | |
| 2012/0325564 A1* | 12/2012 | Vaughn | E21B 47/01 175/428 |
| 2013/0270008 A1* | 10/2013 | DiGiovanni | E21B 10/62 175/40 |
| 2014/0326506 A1* | 11/2014 | DiFoggio | E21B 10/567 175/39 |
| 2017/0284161 A1* | 10/2017 | Zhang | E21B 10/5735 |
| 2017/0292376 A1 | 10/2017 | Kumar et al. | |
| 2018/0058147 A1* | 3/2018 | Shotwell | E21B 10/62 |
| 2023/0003120 A1* | 1/2023 | Ghosh | E21B 10/52 |

OTHER PUBLICATIONS

Combined Search and Examination Report issued for GB1907505.0, dated Nov. 20, 2019 (5 pages).
Combined Search and Examination Report issued for GB2007872.1, dated Oct. 21, 2020 (5 pages).

* cited by examiner

CUTTER ASSEMBLY AND METHODS FOR MAKING SAME

CROSS REFERENCE TO RELATED APPLICATIONS

This application is a U.S. national stage entry under 35 U.S.C. § 371 of PCT/EP2020/064634 filed on May 27, 2020 which claims priority to GB 1907505.0 filed on May 28, 2019, both of which are incorporated by reference in their entirety for all purposes.

FIELD

This disclosure relates generally to cutter assemblies for cutting tools, particularly but not exclusively for earth-boring bits, and/or comprising polycrystalline diamond (PCD) or polycrystalline cubic boron nitride (PCBN) material.

BACKGROUND

Super-hard material such as polycrystalline diamond (PCD) and polycrystalline cubic boron nitride (PCBN) material is used in a wide variety of tools for cutting, machining, drilling or degrading hard or abrasive materials such as rock, metal, ceramics, composites and wood-containing materials. Super-hard cutter elements used in industrial tools or in rock-boring bits, for example, may be exposed in use to high temperatures, as well as to highly abrasive or erosive conditions. This makes it challenging to measure local cutting conditions or to evaluate the working condition of the cutter element.

For example, drill bits used for boring into the earth for oil or gas exploration include arrays of PCD cutter elements, which are driven against rock deep beneath the earth's surface. The depth of operation of the PCD cutter elements adds to the difficulty of evaluating their working condition. Owing to the high cost of pulling a drill bit to the surface to inspect the cutter elements, there is a need to be able to do this in situ, while the bit is drilling into rock down the hole (DTH).

Stoney, R, GE O'Donnell and D Geraghty ("Dynamic wireless passive strain measurement in CNC turning using surface acoustic wave sensor", *Int J Adv Manuf Techol*, Springer, 20 Jun. 2013) discloses using a surface acoustic wave (SAW) for monitoring a machine tool condition. A strain-sensitive wireless passive SAW sensor system is fixed to a tool holder, on which a cutter element is mounted. In use, an interrogation device sends a pulse of RF energy to the sensor and then switches off to receive an "echo-like" response signal, which may contain amplitude and phase information about the response of the SAW system.

There is a need for determining one or more condition of cutter elements, particularly but not exclusively for earth-boring drill bits while in use, without substantial degradation of a sensor device during the working life of the cutter element.

SUMMARY

Viewed from a first aspect, there is provided a cutter assembly for a cutting tool comprising a super-hard volume of super-hard material having a proximal end and a distal end, and including a cavity; and a cover member; the super-hard volume having a super-hard surface at the distal end including a cutting edge; the cavity having a cavity open end at the distal end; the super-hard surface including a cavity peripheral area coterminous with the cavity open end; the cover member including a cover peripheral area configured to mate with the cavity peripheral area to allow the cover member to cover the cavity at the cavity open end; the covered cavity providing a housing chamber within the super-hard volume.

Viewed from a second aspect, there is provided a method of making the above defined cutter assembly, the method including: providing a body comprising a super-hard volume of super-hard material having a proximal end and a distal end; processing the super-hard volume to form a cutting edge at the distal end; removing material from the distal end to form a cavity having a cavity open end, and a cavity peripheral area coterminous with the cavity open end; providing a cover plate comprising the super-hard material, and processing the cover plate to form a plate peripheral area configured to mate with the cavity peripheral area; and joining the plate peripheral area to the cavity peripheral area.

Various example methods and systems are envisaged by this disclosure, of which various non-limiting, non-exhaustive examples and variations are described as follows.

In some example arrangements, the cover assembly may include an electronic device housed within the housing chamber.

In some example arrangements, the cover assembly may include a join layer, joining the cover peripheral area to the cavity peripheral area, to attach the cover member to the super-hard volume and cover the cavity. For example, the join layer may comprise metallic alloy material; the join layer may comprise metallic alloy including one or more of Al, Ni, Cu, Si, Au, Sn and In.

In some example arrangements, the join layer may comprise join material, and a region of the super-hard volume adjacent the cavity peripheral area may include a portion of the join material.

In some example arrangements, the cover member may comprise the super-hard material. The super-hard material comprised in the super-hard volume and/or the cover member may comprise diamond or cubic boron nitride (CBN) material.

In some example arrangements, the cavity may extend through the super-hard volume, from the cavity open end to the proximal end.

In some example arrangements, the cutter assembly may comprise a substrate portion; the super-hard volume joined to the substrate portion at an interface boundary, coterminous with the proximal end of the super-hard volume.

In some example arrangements, the super-hard volume may include a channel connecting the cavity to an aperture remote from the cavity.

In some example arrangements, the super-hard volume may have a side connecting the proximal end and the distal end; wherein the cavity extends to the side.

In some example arrangements, the cavity peripheral area and the cover peripheral area may comprise respective mating cone surface areas.

In some example methods of making a disclosed example cutter assembly, joining the plate peripheral area to the cavity peripheral area may include applying braze alloy material to at least one of the plate peripheral area to the cavity peripheral area; and heat treating the braze alloy material, to braze-join the plate peripheral area to the cavity peripheral area. In some example methods of making a disclosed example cutter assembly, joining the plate peripheral area to the cavity peripheral area may include applying diffusion bonding material to at least one of the plate peripheral area to the cavity peripheral area; and applying pressure to the cover plate, to diffusion-bond the plate peripheral area to the cavity peripheral area.

Non-limiting example methods and systems will be described with reference to the appended drawings, of which.

As used herein, "super-hard" material refers to single- or polycrystalline material having a 1 kg Vickers hardness (HV) of at least 20 GPa. Super-hard material may include single-crystal diamond and cubic boron nitride (cBN) material, as well as certain polycrystalline materials comprising a plurality of diamond or cBN grains. Some super-hard materials may have a 1 kg Vickers hardness of at least 25 GPa, or at least 30 GPa. As used herein, Vickers hardness is according to the ASTM384-08a standard.

A super-hard polycrystalline material may comprise an aggregation of a plurality of super-hard grains such as diamond or cBN grains, a substantial portion of which may be directly inter-bonded and may include interstitial regions among the super-hard grains. The interstitial regions may contain non-super-hard filler material such as metal in elemental or alloy form, ceramic material or intermetallic material, for example. The filler material may bind the super-hard grains together, and/or at least partially fill the interstitial regions. The content of the super-hard grains in super-hard polycrystalline material may be at least about 50 volume %, or at least about 70 volume %, or at least about 80 volume %; and/or at most about 97 volume %, or at most about 95 volume %, or at most about 90 volume % of the polycrystalline material. Some super-hard materials may consist essentially of super-hard grains.

As used herein, polycrystalline diamond (PCD) material comprises a plurality of diamond grains, a substantial portion of which are directly inter-bonded with each other or contact each other at grain boundaries. Polycrystalline diamond may consist essentially of diamond grains, or include non-diamond material or voids. In some PCD material, the diamond grains may account for at least 80% of the volume of PCD material, substantially all the remaining volume being a network of interstitial regions among the diamond grains. The interstitial regions may be partly or entirely filled with diamond sintering aid material, or other filler material, or at least some of the interstitial regions may contain voids. Sintering aid for diamond may also be referred to as "catalyst material" for promoting the growth of diamond grains or the formation of diamond necks between adjacent diamond grains, under thermodynamically stable conditions for diamond. Catalyst material for diamond may also function as solvent material for carbon, and diamond sintering aid material may also be referred to as "solvent/catalyst" material. Examples of solvent/catalyst materials for diamond include iron (Fe), nickel (Ni), cobalt (Co) and manganese (Mn), and certain alloys including at least one of these elements. PCD material may be produced by subjecting an aggregation of diamond grains to an ultra-high pressure (for example, at least about 6 GPa) and a high temperature (for example, at least about 1,200° C.) in the presence of molten solvent/catalyst material. During the HPHT process, solvent/catalyst material may infiltrate through the interstitial regions among the diamond grains from an adjacent source, such as a Co-cemented tungsten carbide substrate. Consequently, PCD material may comprise or consist essentially of the inter-bonded diamond grains and interstitial regions containing Co. Some polycrystalline diamond material consisting essentially of diamond may be manufactured by a chemical vapour deposition (CVD) process.

With reference to FIG. 1A to 4D, various example cutter assemblies 100 comprise example cutter inserts 110 including a cavity 180 for housing an electronic device 130, and a cover member 182 for covering the cavity 180, to provide a housing chamber 180 for housing the electronic device 130. As used herein, a cutter insert may be a type of cutter element that can be attached to a tool body such as a drill bit by inserting the cutter insert into a recess provided in the tool body. The illustrated example cutter inserts 110 may be for a drill bit (not shown) for an earth-boring drill, as may be used in oil and gas exploration. The cutter insert 110 comprises a proximal end 106 and a distal end 108, and may comprise a super-hard portion 112 joined to a substrate portion 114 at an interface boundary 113. The interface boundary 113 may be substantially planar or non-planar. The cutter insert 110 may have a longitudinal axis L and have a side 104, coaxial with the longitudinal axis L, connecting the proximal end 104 and the distal end 108. The super-hard portion 112 may comprise or consist essentially of a volume of polycrystalline diamond (PCD) material and the substrate portion 114 may comprise or consist essentially of cobalt-cemented tungsten carbide (Co—WC) material (in such examples, the super-hard portion 112 may be referred to herein as the "PCD portion" 112). The interface boundary 113 may be coincident with a proximal end 113 of the PCD portion 112.

The PCD portion 112 has a PCD surface 118 at the distal end 108, including a cutting edge 116, and the substrate portion 114 may be coterminous with the proximal end 106. The cutter insert 110 may be substantially cylindrical and the PCD portion 112 may have a diameter D1 of about 16 mm and a thickness T1 (see FIG. 1C) of about 2 to 3 mm from the PCD surface 118 to the interface boundary 113 (that is, the proximal end 113 of the PCD portion 112). The PCD portion 112 includes the cavity 180, which is cylindrical in this example, having a cavity open end 187 at the distal end 108 and extending a depth T2 of about 300 to 500 microns into the PCD portion 112. The cavity 180 may have a diameter D2 of about 12 mm, the cavity open end 187 being circular.

Figure 1A:
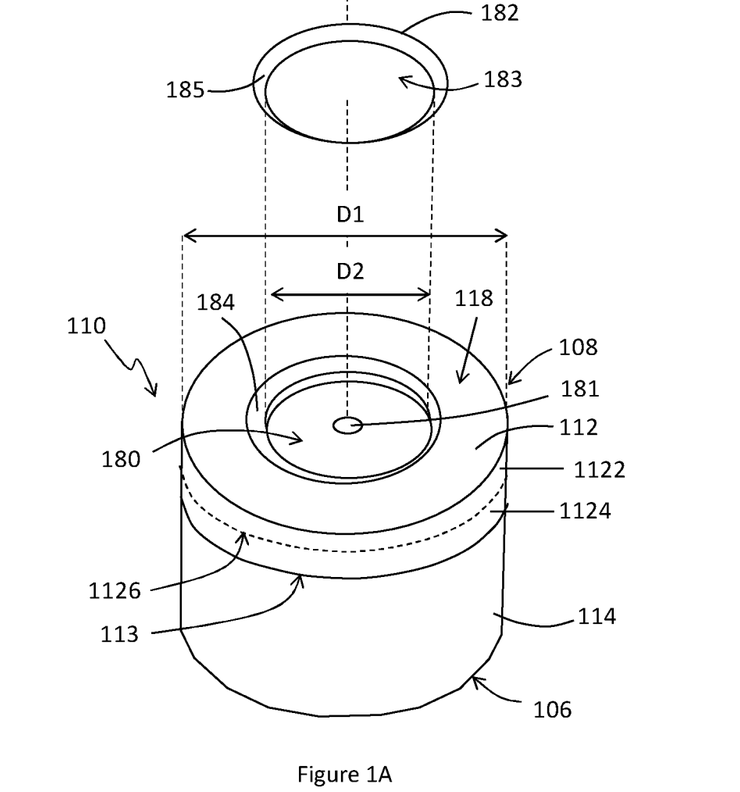
FIG. 1A shows a schematic perspective view of an example cutter insert including an open cavity in a layer of PCD material, and a cover for closing the cavity, in which the cover is shown removed from the cavity.
Figure 1B:
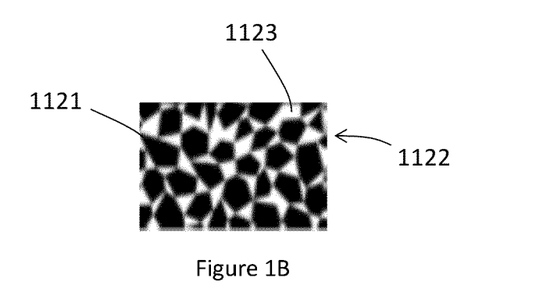
FIG. 1B shows a schematic illustration of example microstructure of PCD material.
Figure 1C:
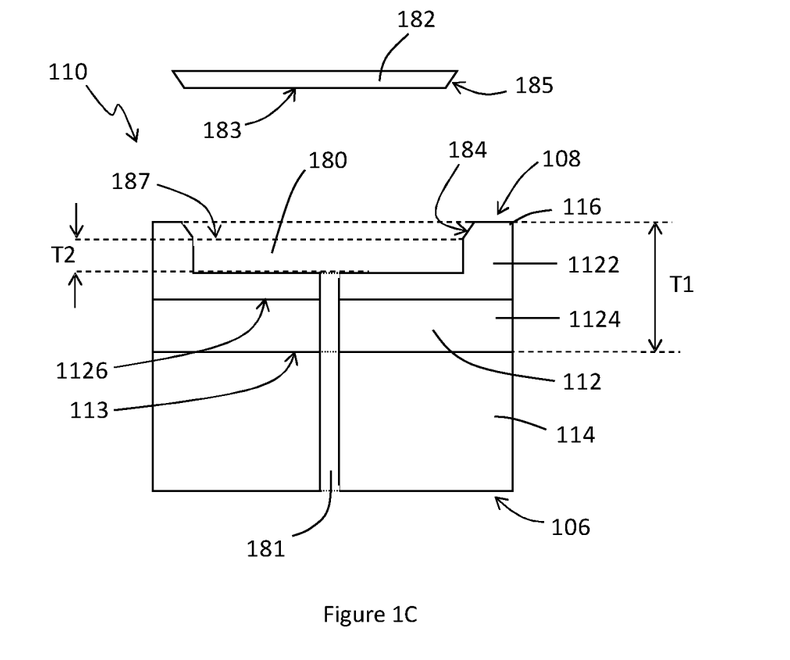
FIG. 1C shows a schematic longitudinal cross-section through the example cutter insert illustrated in FIG. 1A, including an open cavity and a cover for the cavity, in which the cover is shown removed from the cavity.

The PCD surface 118 may include an annular cavity peripheral area 184, coterminous with the cavity open end 187. The cover member 182 may have the form of a circular plate 182, including a cover peripheral area 185 that is configured to mate with the cavity peripheral area 184. For example, both the cavity peripheral area 184 and the cover peripheral area 185 may be angled at substantially the same angle with respect to the longitudinal axis L, the angle being about 10° to about 80°. In the illustrated examples, the peripheral areas 184, 185 are angled at about 40° to 50° with respect to the longitudinal axis L. The cover member 182 may have a cover surface 183 having the same diameter D2 as the cavity open end 187, so that the cover member 182 can fit over the cavity 180, the cover peripheral area 185 mating with the cavity peripheral area 184 and the cover surface 183 facing into the cavity 180.

When assembled, the cutter assembly 100 may include a join layer 188, joining the cover peripheral area 185 to the cavity peripheral area 184, and thus attaching the cover member 182 to the PCD portion 112 and closing the cavity 180 at the cavity open end 187. The join layer 188 may comprise or consist essentially of an adhesive material such as epoxy material, or metallic alloy material such as braze material or diffusion bonding material. The cover member 182 may entirely or partly close the cavity 180 to form a closed or partly closed chamber for housing the electronic device 130.

In some examples, the cutter element 110 may include a passage 181 connecting the cavity 180 to the proximal end 106 of the cutter element 110, for allowing a connection wire or optical fibre (not shown) to extend from the electronic device 130 within the housing chamber 180 to an external device or power source (not shown).

In other examples, the cavity peripheral area 184 may be substantially parallel to the longitudinal axis, and the cover peripheral area 185 may be a cylindrical side 185 of the cover member 182. That is, the cavity and cover peripheral areas 184, 185 may be angled at about 0° with respect to the longitudinal axis L. In various examples, diameter D1 of the cutter insert 110 may be about 13 mm, about 16 mm, about 19 mm or about 25 mm; and in some example arrangements, example cutter inserts 110 may have non-cylindrical shapes.

In some examples, the PCD portion 112 may comprise a first PCD portion 1122 and a second PCD portion 1124. The first PCD portion 1122 may be coterminous with the PCD surface 118 and the second PCD portion 1124 may be remote from the PCD surface 112 and adjacent the substrate portion 114, coterminous with the interface boundary 113. The first PCD portion 1122 may extend to a depth of about 300 to 500 microns from the PCD surface 118 to an interface boundary 1126 with the second PCD portion 1124, which may have a mean thickness of about 2.5 to about 2.8 mm. In the first PCD portion 1122, the interstitial regions 1123 among the PCD grains 1121 (illustrated in FIG. 1B) may form an open porous network of voids, the first PCD portion 1122 being electrically insulating and including less than 2 weight percent (wt. %) metallic material. In the second PCD portion 1124, the interstitial regions 1123 may be substantially filled with metal catalyst material such as Co (or alloy including Co), which may form an interconnected metallic network 1123 capable of conducting an electric current. In some example arrangements, the depth T2 of the cavity 180 may be less than the depth of the first PCD portion 1122, or the cavity 180 may extend into the second PCD portion 1124.

Figure 2:
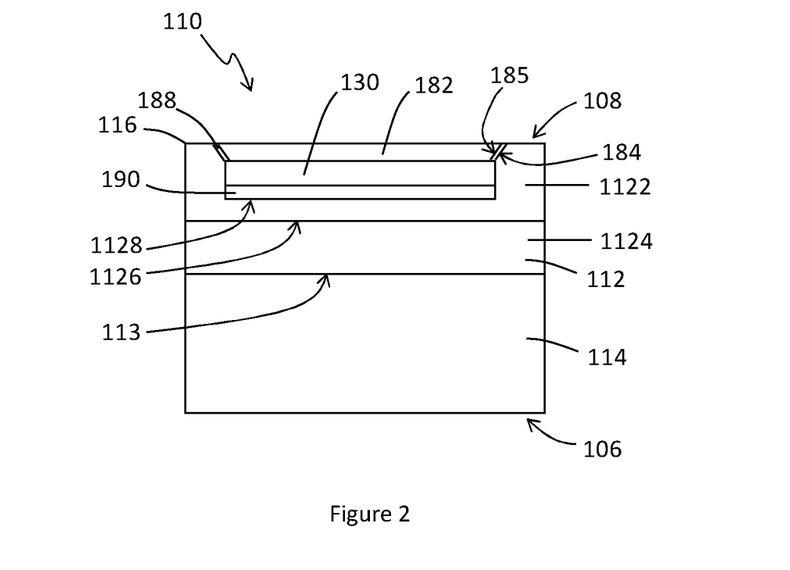
FIG. 2 shows a schematic longitudinal cross-section view through an example cutter insert, illustrating a closed cavity housing an electronic device.

With reference to FIG. 2, an example cutter assembly 100 may include an electronic device 130 such as a sensor device 130 within the housing chamber 180. In this example, the cavity 180 a blind end, terminating within the first PCD portion 1122. The electronic device 130 may be attached to the PCD portion 112 at the blind end of the cavity 180 by a connection portion 190. In some examples, the connection portion 190 may comprise certain metal alloy materials having a liquidus temperature of 600° C. to 950° C. (at atmospheric pressure), a portion of which may be infiltrated into interstitial voids within the first PCD portion 1122. The connection portion 190 may be chemically bonded to a device (not shown) and to diamond grains of the PCD material 112. The connection portion 190 may comprise metal alloy, a substantial portion of which may be infiltrated into the interstitial pores of the first PCD portion 1122. A non-infiltrated portion 1124 of the first PCD portion 120 may have an interface boundary 1128 with the connection portion 190.

Figure 3A:
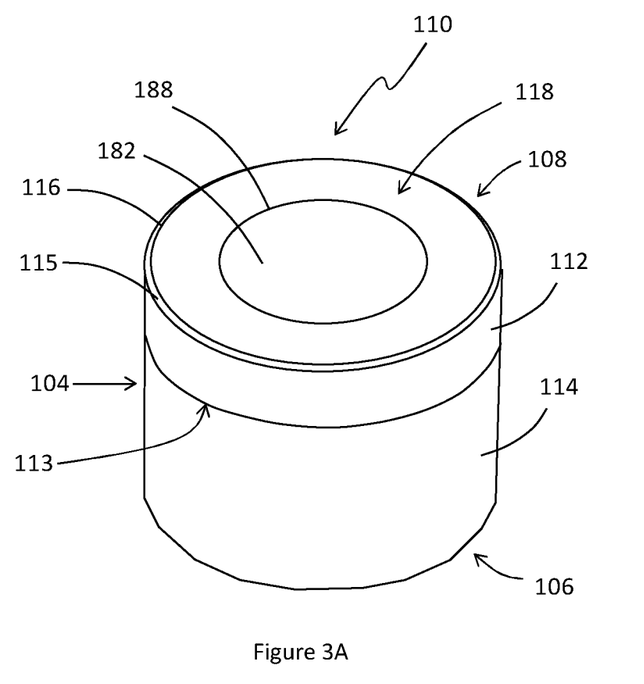
FIG. 3A shows a schematic perspective view of an example cutter insert, comprising a layer of super-hard material joined to a cemented carbide substrate and a cover member in position over a cavity.
Figure 3B:
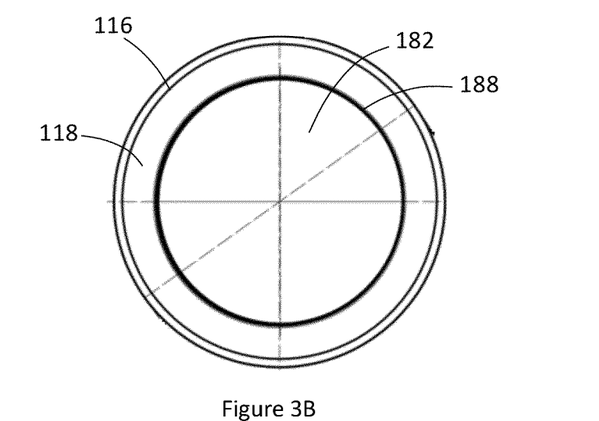
FIG. 3B shows a schematic top view of the example cutter insert illustrated in FIG. 3A.
Figure 4A:
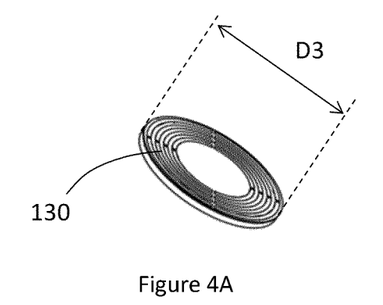
FIG. 4A shows a schematic perspective view of an example RF backscatter transceiver for an example cutter assembly.
Figure 4B:
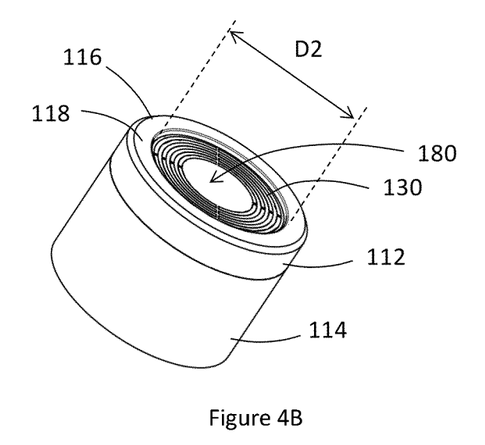
FIG. 4B shows a schematic perspective view of part of a cutter insert, including a cavity formed into a super-hard portion, containing the RF backscatter transceiver illustrated in FIG. 4A (the cover member for closing the cavity is not shown in this drawing)
Figure 4C:
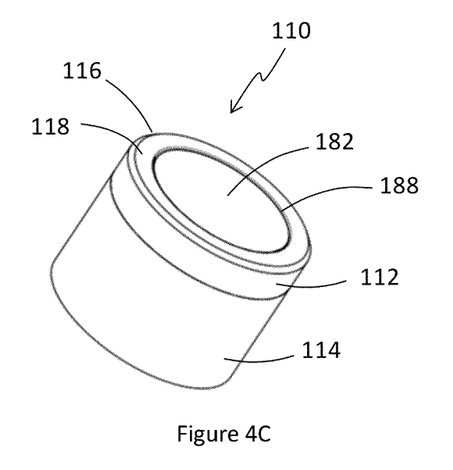
FIG. 4C shows a schematic perspective view of the example cutter insert of FIG. 4B, including the cavity cover in position over the cavity and attached to the super-hard portion.
Figure 4D:
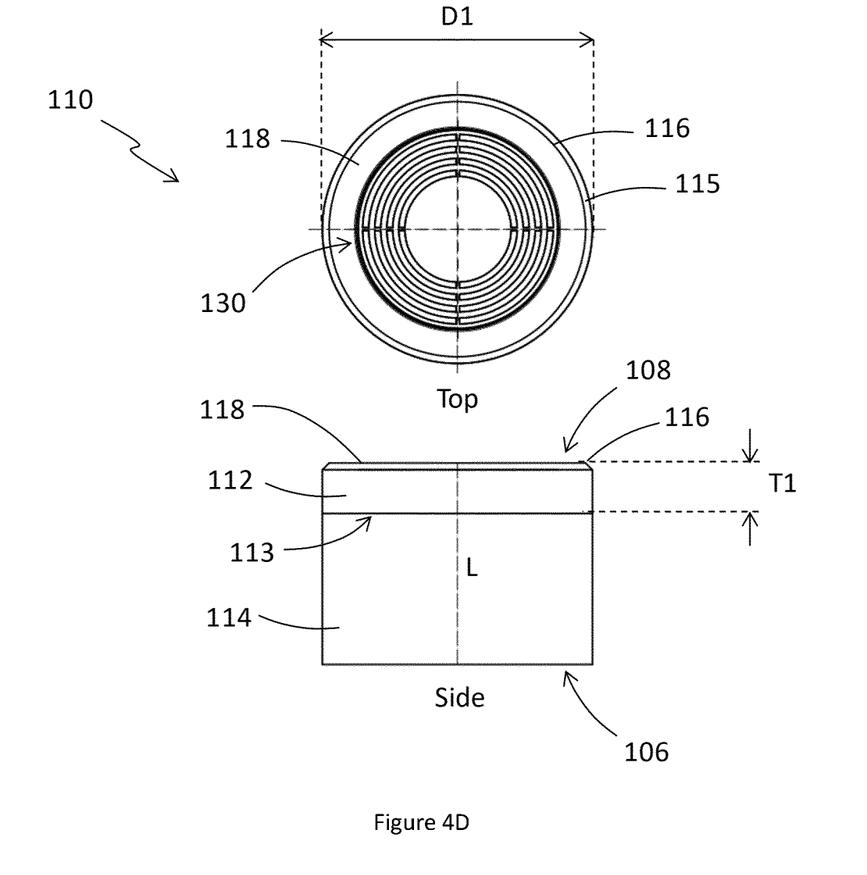
FIG. 4D shows schematic top and side views of the example cutter insert, excluding the cavity cover to show the RF backscatter transceiver housed within a cavity in a super-hard cutting layer.

FIGS. 3A and 3B illustrate an example cutter insert 110 comprising a PCD portion 112 attached to a substrate portion 114, in which the cavity 180 formed in the PCD portion 112 is closed by the cover member 182. The PCD portion 112 includes a PCD surface 118 at the distal end 108. The peripheral region (not shown) of the cover member 182 is seated adjacent the peripheral region (not shown) of the PCD surface 118, a layer of join material 188 attaching the peripheral regions 184, 185 to each other. In various examples, the join material 188 may comprise epoxy or other adhesive material, or metal alloy material, such as braze alloy. The electronic device 130 may comprise a sensor 130. In various examples, the electronic device 130 may comprise a wide range of electronic components, including one or more resistor, capacitor, inductor, transistor and/or electrically conducting tracks. In this example, the PCD portion 112 has a super-hard surface 118 defining a circumferential cutting edge 116 and including a chamfer area 115, adjacent the cutting edge 116.

In various example cutter assemblies 100, the electronic device 130 may comprise an RF tag 130 for use with an RF interrogation transceiver (not shown), in an RFID-type tag arrangement. The RF tag 130 comprises an antenna system, provided in the shape of a circular disc having diameter D3 of 11.5 mm. With reference to FIGS. 4A to 4D, an example cutter insert 110 for an earth-boring bit (not shown) may comprise a layer of PCD material 112 joined to a cemented carbide substrate portion 114, and include a cavity 180 containing an RF (radio-frequency) antenna 130, capable of backscattering an RF interrogation signal transmitted by an interrogation transceiver (not shown). The RF interrogation signal may have a frequency in the range of about 2 to 10 GHz; in general, the RF interrogation signal frequency may lie within the industrial, scientific and medical (ISM) radio band. In other examples, the cavity 180 may contain a transceiver device 130 including a surface acoustic wave (SAW) sensor.

In the illustrated example, the PCD material 112 defines a circumferential cutting edge 116 and includes a chamfer area 115 adjacent the cutting edge 116. The PCD layer 112 (and the substrate portion 114) may have a diameter D1 of 16 mm and a mean thickness of about 3 mm. The cavity 180 is substantially cylindrical, having a diameter D2 of about 12 mm and a depth (not indicated) of 0.8 mm, to accommodate the RF antenna 130. The cavity 180 is covered by a protective cover member 182, which is joined by a join layer 188 to the PCD material 112. In this example arrangement, the cavity peripheral area (not shown) may be provided as a vertical extension of the cylindrical wall of the cavity 180, parallel to and coaxial with the longitudinal axis L, and the cover peripheral area (not shown) may cylindrical. The join layer 188 is disposed between the cavity and cover peripheral areas and may comprise a high temperature adhesive material, which may be resistant to the dynamic stresses arising from vibration of the cutter element in use, or braze material. The PCD layer 112 has a PCD surface 118 surrounding the cavity 180 and extending radially from the join layer 188 to the cutting edge 116.

The protective cover member 182 may comprise a thin disc of PCD material, or a disc of diamond manufactured by chemical vapour deposition (CVD), or a disc of other abrasion-resistant material such as aluminium nitride or silicon nitride ($Si_3N_4$), which may have the aspect of reducing attenuation of the RF response signal. The cover member 182 may have a mean thickness of about 100 to 150 microns and an additional coating (not shown) comprising or consisting essentially of chemical vapour deposited (CVD) diamond, or material deposited by physical vapour deposition (PVD).

Figure 5A:
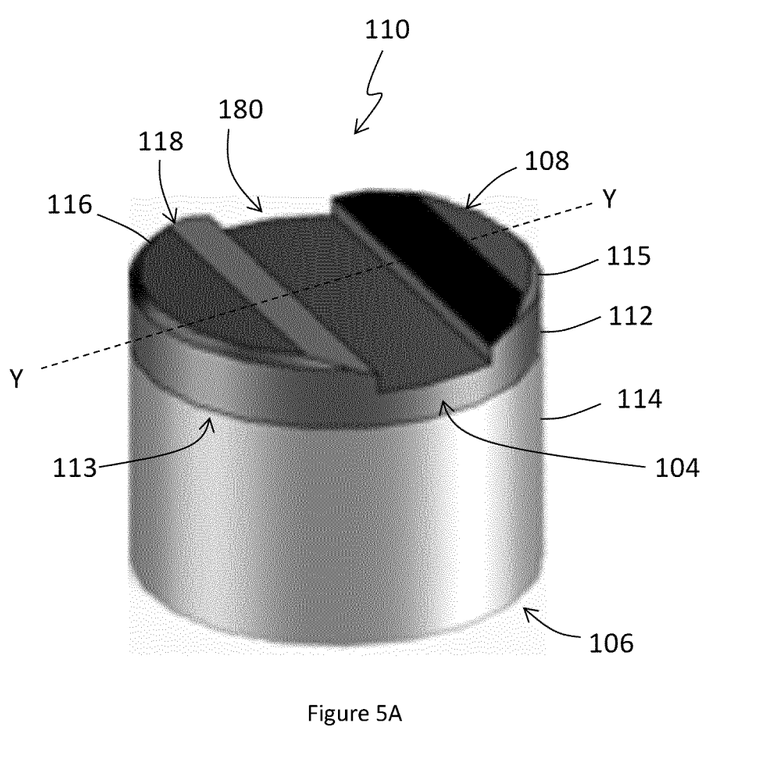
FIG. 5A shows a schematic perspective view of an example cutter insert comprising a super-hard portion attached to a substrate portion, including an oblong cavity extending diametrically through the super-hard portion.
Figure 5B:
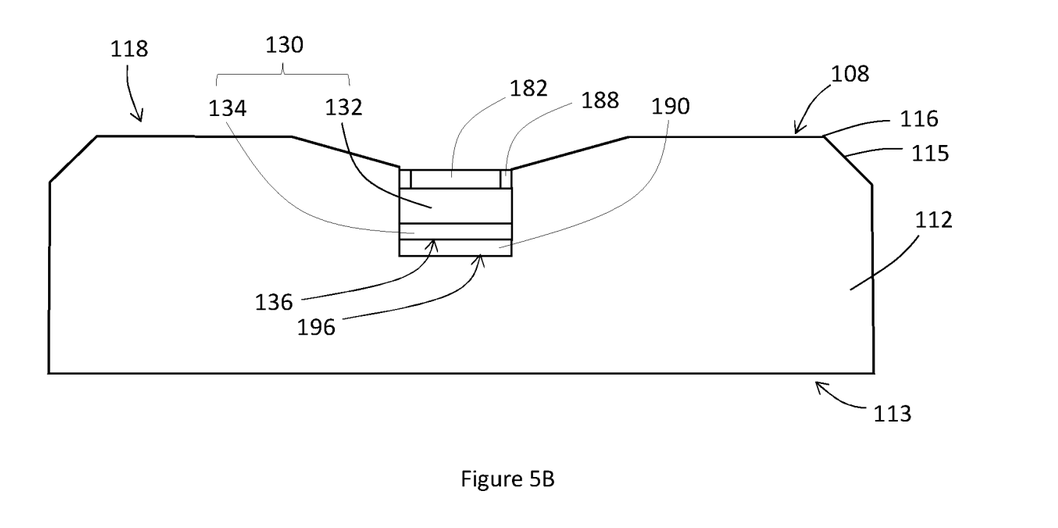
FIG. 5B shows a schematic longitudinal cross-section view through an example cutter assembly, in the plane indicated as Y-Y in FIG. 5A.

With reference to FIGS. 5A and 5B, an example cutter insert 110 has a proximal end 106 and a distal end 108 and comprises a PCD portion 112 joined to a Co—WC substrate 114 at an interface boundary 113. The layer of PCD material 112 has a PCD surface 118 at the distal end 108, and the interface boundary 113 with the substrate portion 114 coincides with a proximal end 113 of the PCD layer 112. The PCD surface 118 includes a peripheral cutting edge 116 and a chamfer 115 is formed on the PCD material 112, adjacent the cutting edge 116. In this example, the cavity 180 is a trench 180 extending diametrically through the PCD material 112, for accommodating an electronic device 130.

FIG. 5B shows a schematic longitudinal cross-section view through the PCD portion 112, in a plane including the line Y-Y in FIG. 5A. The example electronic device 130 is attached to the PCD material 112, positioned within the cavity 180. The electronic device 130 comprises an electronic component 132 and an electrically insulating base plate 134, which may comprise or consist essentially of electrically insulating ceramic material. In various examples, the electronic component 132 may comprise a sensor device (or a part of a sensor device), a transceiver, and/or an electronic circuit such as an integrated circuit (IC). A connection portion 190 comprising alloy material may join a surface 136 of the base plate 134 to the bottom of the cavity 180 and have an interface boundary 194 with the PCD material 112.

The cover member 182 is attached to the PCD portion 112 as illustrated in FIG. 5B, positioned over the electronic device 130, to protect it from abrasion or other degradation processes in use. The cover member 182 may comprise or consist essentially of PCD material, diamond made by chemical vapour deposition (CVD), and/or other abrasion-resistant material such as alumina, aluminium nitride, zirconia, silicon nitride, polycrystalline cubic boron nitride, PCBN, material. In this example, the cover member 182 may be oblong in shape, to match the shape of the cavity 180, and have a mean thickness of about 100 to about 150 microns. In examples where the electronic device 130 includes a transceiver antenna, the material selected for the cover member 182 may have suitable dielectric properties to allow RF signals to pass with as little attenuation as possible.

In this example, the PCD portion 112 includes a pair of parallel cavity peripheral areas (not shown) on opposite sides of the cavity 180, the and the cover member 182 has a corresponding pair of parallel sides. The join layer 188 between each pair of parallel cover and cavity peripheral areas may comprise braze material or adhesive material, such as epoxy, or the cover member 182 may be joined to the PCD material 112 by a diffusion bonding process, for example.

An example method for making an example cutter insert 110 will be briefly described with reference to FIGS. 1A to 4D. A composite body (not shown) comprising, or consisting essentially of, PCD material 112 joined to a substrate portion 114 at an interface boundary 113 may be provided. The composite body may be manufactured by means of an ultra-high pressure, high temperature (HPHT) process. An HPHT process may include placing an aggregation of diamond grains onto a Co—WC substrate 114, to provide a pre-sinter assembly (not shown). In some example processes, the aggregation of diamond grains may include catalyst material such as Co, in powder form or microstructures on the diamond grains. The pre-sinter assembly may be pressurised to about 6 GPa (or higher) and heated to a temperature of at least about 1,250° C. The Co within the substrate 114, and potentially within the aggregation of diamond grains, will melt and infiltrate under capillary action into interstitial regions among the diamond grains, and promote the direct inter-growth of neighbouring diamond grains. When the pressure and temperature are decreased to ambient conditions, the Co (or alloy including Co, for example) will solidify, providing the composite body comprising the layer of PCD material 112 joined to the substrate portion 114. As used herein, ambient or atmospheric pressure is about 1.0 MPa. The layer of PCD material 112 may have a thickness of about 2 to 3 mm, the interstitial regions among the diamond grains filled with metallic material including Co.

The composite body may have a proximal end 106, coterminous with the substrate portion 114, and a distal end 108, coterminous with a PCD surface 118 of the PCD material 112. The PCD material 112 may be treated with acid (not shown) at the distal end 108 to remove (or 'leach') Co from the interstitial regions among the diamond grains, to provide the first PCD portion 1122, coterminous with the PCD surface 118. The first PCD portion 1122 may extend to a depth of about 500 microns from the PCD surface 118.

The cavity 180 may be formed by removing PCD material 112 from the distal end 108, for example by machining the PCD material 112 or etching it by means of a laser etching device. A mask (not shown) may be provided, having a through-aperture in the shape of the electronic device 130 and placed over the PCD surface 118. A laser machining or etching apparatus may be used to remove PCD material 112 from a region of the PCD surface 118 exposed by the mask, to form the cavity 180. The angled peripheral region 184 may then be formed by cutting or grinding PCD material 112 adjacent the cavity 180. Residual graphitic carbon within the cavity 180 may be removed by sand-blasting. The shape and depth of the cavity 180 should be sufficient to accommodate the device 130 to be housed therein. For example, the cavity may have a mean depth of about 300 microns if the electronic device 130 has a thickness of no more than 300 microns. In some example methods, the cavity 180 may be formed before the PCD material 112 is treated with acid to remove Co from the first PCD portion 1122.

In some examples, a layer of paste containing braze alloy material may be deposited onto the bottom of the cavity 180, to join the electronic device 130 to the PCD material 112. For example, the metal alloy material may include the chemical elements silver (Ag), copper (Cu), Indium (In) and titanium (Ti), such as the commercially available Incusil™ alloy having the composition 59.0% Ag, 27.25% Cu, 12.50% In and 1.25% Ti. In some examples, the metallic join material may comprise an alloy including Pt and/or Pd; in some examples, metallic join material may include gold (Au), in elemental or alloy form. Non-limiting example alloys for use as metallic join materials are shown in Table 1.

TABLE 1

| Family | Liquidus temperature, (° C.) | Cu, wt. % | Pd, wt. % | Ag, wt. % | Ti, wt. % | In, wt. % | Sn, wt. % | Mn, wt. % | Al, wt. % |
|---|---|---|---|---|---|---|---|---|---|
| Cu—Ag—In | 715 | 27.3 | | 59 | 1.25 | 12.5 | | | |
| Ag—Cu | 815 | 35.3 | | 63 | 1.75 | | | | |
| Ag—Cu | 900 | 26.7 | | 69 | 4.5 | | | | |
| Ag | 912 | 5 | | 93 | 1.2 | | | | 0.8 |
| Cu—Ag | 730 | 32.5 | | 57.5 | | | 7 | 3 | |
| Ag—Cu | 790 | 22 | | 75 | | | | 3 | |
| Ag—Cu | 705 | 24 | | 61.5 | | 14.5 | | | |
| Ag—Cu | 852 | 31 | 10 | 59 | | | | | |
| Ag | | | | 98.4 | 0.6 | 1 | | | |

In some examples, a base may be attached to the PCD material 112 within the cavity 180 by means of adhesive material, or a glass ceramics-based material having a high curing temperature. The electronic device 130 may include a base comprising ceramic material such as yttria-stabilized cubic zirconia, alumina, barium titanate, lanthanum titanate, silicon carbide, lithium niobite, which can bond to the metal join alloy.

The electronic device 130 may be placed onto the layer of metallic join material to provide a pre-composite assembly (not shown), which may be heat treated at a temperature of about 740° C. in a vacuum of about 1 mPa ($10^{-5}$ mbar), where the metallic join material comprises Incusil™ alloy. The Ti within the alloy material will react with carbon from the diamond grains to form TiC, chemically bonding the alloy material to the diamond grains. The temperature is then reduced to ambient temperature (about 20° C. to about 40° C.), well below the melting point of the alloy material, allowing the alloy material to solidify and form the connection portion 190.

Suitable metal alloy materials should have a melting point of at most about 950° C., and may solidify at temperatures of up to about 600° C. If the liquidus temperature of the metallic join material is too low, then it may melt when the composite product, such as a cutter insert, is braze-joined to a tool, such as a drill bit. Brazing the cutter insert onto the drill bit body may involve heating at least a portion of the cutter insert to a temperature of about 650° C. to about 700° C. In such examples, the melting point of the metallic join material (at or below atmospheric pressure) may be greater than about 700° C., to reduce the risk of melting when the cutter insert is braze-joined to a tool.

In general, the electronic device may be joined to the PCD material by melting the metallic join material in an atmosphere having a pressure of at least about $10^{-3}$ mbar (100 mPa) or at least about $10^{-5}$ mbar (10 Pa); for example, in the range of about $10^{-3}$ mbar (100 mPa) to about $10^{-5}$ mbar (10 Pa). Heat treating at such pressures may have the aspect of enhancing the chemical reaction of the metallic join material (alloy) with the diamond grains and enhancing its infiltration through the interstitial voids. In some examples, the heat treatment may be carried out in an inert atmosphere.

In some applications, the temperature in a region of the PCD material adjacent the cutting edge may exceed about 1,000° C. In such applications, the cavity 180 may be positioned sufficiently spaced apart from a cutting edge 116, to reduce a risk of damage to the electronic device 130 and the risk of the cover member 182 detaching from the PCD material 112 due to metal join material melting in use.

When the electronic device 130 has been placed into the cavity 180 and, in some examples, attached to the PCD material 112, the cover member 182 can be attached to the PCD material 112 to cover the electronic device 130. The cover member 182 may comprise abrasion resistant material to protect the electronic device from damage in use. The material of the cover member 182 may be have other desire properties, such as a dielectric property for allowing radio-frequency signals to be received and/or emitted by the electronic device 130. For example, the electronic device 130 may include a transceiver antenna and the material selected for a cover 180 should have suitable dielectric properties to allow RF signals to pass with as little attenuation as possible. The cover member 182 may comprise or consist essentially of PCD material (or other abrasion-resistant material, such as alumina, aluminium nitride zirconia, silicon nitride, polycrystalline cubic boron nitride, PCBN, material, or a layer of diamond made by a CVD process).

As an example, the cover member 182 may comprise or consist essentially of PCD material and may be provided by machining a body of PCD material (not shown). For example, a disc (not shown) may be cut from a body of PCD material and the disc may be machined to form the angled peripheral region 185. The cover peripheral area may be joined to the cavity peripheral area by braze material or adhesive material, such as epoxy, or by a diffusion bonding process, for example. As an example, a layer of metallic alloy material (or precursor material for forming a metallic alloy) may be deposited onto one or both peripheral regions by a sputtering or other PVD method. Pressure may be applied to the cover member 182 to enhance inter-diffusion of the alloy material into the cover member 182 and the PCD material 112.

The invention claimed is:

1. A cutter assembly for a cutting tool, comprising
a super-hard volume of super-hard material having a proximal end and a distal end and including a cavity; and
a cover member comprising the super-hard material;
the super-hard volume having a super-hard surface at the distal end including a cutting edge;
the cavity having a cavity open end at the distal end;
the super-hard surface including a cavity peripheral area coterminous with the cavity open end;
the cover member including a cover peripheral area configured to mate with the cavity peripheral area to allow the cover member to cover the cavity at the cavity open end; the covered cavity providing a housing chamber within the super-hard volume.

2. A cutter assembly as claimed in claim 1, including an electronic device housed within the housing chamber.

3. A cutter assembly as claimed in claim 1, including a join layer joining the cover peripheral area to the cavity peripheral area, to attach the cover member to the super-hard volume and cover the cavity.

4. A cutter assembly as claimed in claim 3, wherein the join layer comprises metallic alloy material.

5. A cutter assembly as claimed in claim 3, wherein the join layer comprises metallic alloy including one or more of Al, Ni, Cu, Si, Au, Sn and In.

6. A cutter assembly as claimed in claim 3, wherein the join layer comprises join material; and a region of the super-hard volume adjacent the cavity peripheral area includes a portion of the join material.

7. A cutter assembly as claimed in claim 1, the super-hard material comprises diamond or cubic boron nitride (CBN) material.

8. A cutter assembly as claimed in claim 1, wherein the cavity extends through the super-hard volume from the cavity open end to the proximal end.

9. A cutter assembly as claimed in claim 1, comprising a substrate portion; the super-hard volume being joined to the substrate portion at an interface boundary coterminous with the proximal end of the super-hard volume.

10. A cutter assembly as claimed in claim 1, the super-hard volume including a channel connecting the cavity to an aperture remote from the cavity.

11. A cutter assembly as claimed in claim 1, the super-hard volume having a side connecting the proximal end and the distal end; wherein the cavity extends to the side.

12. A cutter assembly as claimed in claim 1, the cavity peripheral area and the cover peripheral area comprising respective mating cone surfaces.

13. A method of making a cutter assembly as claimed in claim 1, the method including:
providing a super-hard volume of super-hard material having a proximal end and a distal end;
processing the super-hard volume to form a cutting edge at the distal end;
removing super-hard material from the distal end to form a cavity having a cavity open end, and a cavity peripheral area coterminous with the cavity open end;
providing a body comprising the super-hard material, and
processing the body to form a cover plate including a plate peripheral area configured to mate with the cavity peripheral area; and
joining the plate peripheral area to the cavity peripheral area.

14. A method of making a cutter assembly as claimed in claim 13, wherein joining the plate peripheral area to the cavity peripheral area includes:
applying braze alloy material to at least one of the plate peripheral area or the cavity peripheral area; and
heat treating the braze alloy material, to braze-join the plate peripheral area to the cavity peripheral area.

15. A method of making a cutter assembly as claimed in claim 13, wherein joining the plate peripheral area to the cavity peripheral area includes:
applying diffusion bonding material to at least one of the plate peripheral area or the cavity peripheral area; and
applying pressure to the cover plate to diffusion-bond the plate peripheral area to the cavity peripheral area.

* * * * *